United States Patent
Liu et al.

(10) Patent No.: US 12,079,472 B2
(45) Date of Patent: Sep. 3, 2024

(54) DATA REDUCTION METHOD, APPARATUS, COMPUTING DEVICE, AND STORAGE MEDIUM FOR FORMING INDEX INFORMATION BASED ON FINGERPRINTS

(71) Applicant: HUAWEI TECHNOLOGIES CO., LTD., Guangdong (CN)

(72) Inventors: Bang Liu, Saint Petersburg (RU); Liyu Wang, Beijing (CN); Kun Guan, Saint Petersburg (RU); Wen Yang, Chengdu (CN); Jianqiang Shen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/732,675

(22) Filed: Apr. 29, 2022

(65) Prior Publication Data
US 2022/0253222 A1    Aug. 11, 2022

Related U.S. Application Data

(63) Continuation of application No. PCT/CN2020/120990, filed on Oct. 14, 2020.

(30) Foreign Application Priority Data

Nov. 1, 2019  (CN) .......................... 201911061340.4

(51) Int. Cl.
G06F 3/06    (2006.01)

(52) U.S. Cl.
CPC ............ *G06F 3/0608* (2013.01); *G06F 3/064* (2013.01); *G06F 3/0671* (2013.01)

(58) Field of Classification Search
None
See application file for complete search history.

(56) References Cited

U.S. PATENT DOCUMENTS 8,396,841 B1    3/2013  Janakiraman
8,732,403 B1 *  5/2014  Nayak ................... G06F 3/0619
                                                    711/170

(Continued)

FOREIGN PATENT DOCUMENTS

CN    101963982 A    2/2011
CN    102222085 A    10/2011

(Continued)

OTHER PUBLICATIONS

International Search Report and Written Opinion issued in PCT/CN2020/120990, dated Jan. 12, 2021, 10 pages.

(Continued)

*Primary Examiner* — Christopher D Birkhimer

(57) ABSTRACT

A data reduction method, apparatus, and computing device and a storage medium are provided. The method includes: when reduction is to be performed on a to-be-reduced data block, obtaining a fingerprint of the to-be-reduced data block; forming an index set based on the fingerprint of the to-be-reduced data block by using index information of data blocks with identical fingerprints; and performing, in the to-be-reduced data block based on the fingerprint of the to-be-reduced data block, data reduction processing on a data block to which index information in a same index set belongs.

17 Claims, 7 Drawing Sheets

(56) References Cited

U.S. PATENT DOCUMENTS

| | | | | |
|---|---|---|---|---|
| 8,930,648 | B1* | 1/2015 | Storer | G06F 3/0641 |
| | | | | 711/161 |
| 8,996,797 | B1* | 3/2015 | Zheng | G06F 3/061 |
| | | | | 711/163 |
| 9,715,434 | B1* | 7/2017 | Xu | G06F 3/067 |
| 10,019,459 | B1* | 7/2018 | Agarwala | G06F 16/182 |
| 10,108,543 | B1* | 10/2018 | Duggal | G06F 11/14 |
| 10,108,544 | B1* | 10/2018 | Duggal | G06F 11/14 |
| 10,346,076 | B1* | 7/2019 | Jonnala | G06F 3/067 |
| 10,394,660 | B2* | 8/2019 | Bolen | G06F 3/061 |
| 10,445,022 | B1* | 10/2019 | Qui | G06F 3/0661 |
| 10,664,165 | B1* | 5/2020 | Faibish | G06F 3/0638 |
| 10,795,812 | B1* | 10/2020 | Duggal | G06F 3/067 |
| 2008/0144079 | A1* | 6/2008 | Pandey | H03M 7/30 |
| | | | | 358/1.15 |
| 2010/0077013 | A1* | 3/2010 | Clements | G06F 16/1748 |
| | | | | 707/822 |
| 2010/0088296 | A1* | 4/2010 | Periyagaram | G06F 16/183 |
| | | | | 707/E17.014 |
| 2010/0125553 | A1* | 5/2010 | Huang | G06F 11/1453 |
| | | | | 707/661 |
| 2010/0174881 | A1* | 7/2010 | Anglin | G06F 11/1453 |
| | | | | 711/E12.103 |
| 2010/0281081 | A1* | 11/2010 | Stager | G06F 9/5022 |
| | | | | 707/814 |
| 2010/0333116 | A1* | 12/2010 | Prahlad | G06F 3/0649 |
| | | | | 713/153 |
| 2011/0320865 | A1* | 12/2011 | Jain | G06F 3/0685 |
| | | | | 714/E11.088 |
| 2012/0136842 | A1 | 5/2012 | Zhu et al. | |
| 2014/0114932 | A1* | 4/2014 | Mallaiah | G06F 3/0641 |
| | | | | 707/E17.032 |
| 2014/0279954 | A1* | 9/2014 | Aronovich | G06F 16/278 |
| | | | | 707/692 |
| 2015/0205816 | A1* | 7/2015 | Periyagaram | G06F 11/1453 |
| | | | | 707/827 |
| 2015/0261776 | A1* | 9/2015 | Attarde | G06F 16/1748 |
| | | | | 707/664 |
| 2016/0335299 | A1* | 11/2016 | Vemulapati | G06F 16/2246 |
| 2016/0350324 | A1* | 12/2016 | Wang | G06F 16/137 |
| 2017/0031994 | A1* | 2/2017 | Patterson, III | G06F 3/0641 |
| 2017/0038978 | A1* | 2/2017 | Li | G06F 3/0611 |
| 2017/0147648 | A1* | 5/2017 | Aronovich | G06F 3/0641 |
| 2017/0293450 | A1* | 10/2017 | Battaje | G06F 3/0679 |
| 2018/0107402 | A1* | 4/2018 | Pogosyan | G06F 11/1448 |
| 2018/0143994 | A1* | 5/2018 | Ohtsuji | G06F 3/0611 |
| 2018/0253255 | A1* | 9/2018 | Jain | G06F 3/0673 |
| 2018/0314727 | A1* | 11/2018 | Epstein | G06N 5/01 |
| 2019/0073151 | A1* | 3/2019 | Marinescu | G06F 3/0673 |
| 2019/0129624 | A1* | 5/2019 | Bandukwala | G06F 16/137 |
| 2019/0227727 | A1* | 7/2019 | Wang | G06F 11/1453 |
| 2019/0235778 | A1* | 8/2019 | Jin | H04L 67/1097 |
| 2019/0310788 | A1* | 10/2019 | Zhang | H03M 7/3059 |
| 2020/0310686 | A1* | 10/2020 | Truong | G06F 3/061 |
| 2021/0036714 | A1* | 2/2021 | Martin | H03M 7/6064 |
| 2021/0117441 | A1* | 4/2021 | Patel | G06F 16/215 |
| 2021/0374021 | A1* | 12/2021 | Santhakumar | G06F 11/3485 |

FOREIGN PATENT DOCUMENTS

| | | | | |
|---|---|---|---|---|
| CN | 102629258 | A | | 8/2012 |
| CN | 103617260 | A | | 3/2014 |
| CN | 104142958 | A | | 11/2014 |
| CN | 104199815 | A * | 12/2014 | ........ G06F 16/215 |
| CN | 105897921 | A | | 8/2016 |
| DE | 102016013248 | A1 * | 5/2017 | ........ G06F 11/14 |
| JP | 2012523023 | A * | 9/2012 | ........ G06F 3/0608 |
| WO | WO-2013074106 | A1 * | 5/2013 | ........ G06F 12/00 |
| WO | WO-2013157103 | A1 * | 10/2013 | ........ G06F 3/0608 |
| WO | WO-2015167447 | A1 * | 11/2015 | ........ G06F 12/0813 |
| WO | WO-2017113123 | A1 * | 7/2017 | ........ G06F 12/0253 |
| WO | WO-2017149592 | A1 * | 9/2017 | ........ G06F 3/0608 |
| WO | WO-2018111133 | A1 * | 6/2018 | ........ G06F 12/0895 |

OTHER PUBLICATIONS

Extended European Search Report issued in EP20881668.6, dated Nov. 22, 2022, 8 pages.

* cited by examiner

DATA REDUCTION METHOD, APPARATUS, COMPUTING DEVICE, AND STORAGE MEDIUM FOR FORMING INDEX INFORMATION BASED ON FINGERPRINTS

CROSS-REFERENCE TO RELATED APPLICATIONS

This application is a continuation of International Patent Application No. PCT/CN2020/120990 filed on Oct. 14, 2020, which claims priority to Chinese Patent Application No. 201911061340.4 filed on Nov. 1, 2019. The disclosures of the aforementioned applications are hereby incorporated by reference in their entireties.

TECHNICAL FIELD

This disclosure relates to the field of big data technologies, and in particular, to a data reduction method, a data reduction apparatus, a computing device, and a storage medium.

BACKGROUND

With rapid development of big data, cloud computing, and artificial intelligence, a data storage demand of enterprises is growing explosively. If the data is stored directly, relatively large storage space is occupied. Therefore, how to improve utilization of storage space and store rapidly growing data in a limited storage capacity is an important issue that needs to be resolved currently.

In a related technology, to improve the utilization of the storage space, a data reduction technology is usually used to compress data. Specific processing is: When receiving to-be-stored data, a storage system segments the data to obtain a to-be-reduced data block, obtains a to-be-deduplicated fingerprint of the data block, and determines, from to-be-deduplicated fingerprints of all data blocks based on the to-be-deduplicated fingerprint (FP), whether the data block can be deduplicated. If the data block cannot be deduplicated, the storage system obtains a similar fingerprint of the data block, and determines, from similar fingerprints (SFP) of all the data blocks based on the similar fingerprint, whether similarity deduplication can be performed on the data block. If similarity deduplication can be performed on the data block, the storage system performs similarity deduplication processing; or if similarity deduplication processing cannot be performed on the data block, the storage system stores the entire data block in a disk.

In the related technology, each time whether data reduction can be performed on data is determined, it is required to determine, from fingerprints of all data blocks, whether data reduction can be performed. When a quantity of all the data blocks is relatively large, a large amount of time is taken, and consequently, resources in the storage system are wasted.

SUMMARY

This disclosure provides a data reduction method, apparatus, and computing device, and a storage medium, to reduce waste of storage resources.

According to a first aspect, a data reduction method is provided, where the method includes:
obtaining a fingerprint of a to-be-reduced data block; forming an index set based on the fingerprint of the to-be-reduced data block by using index information of data blocks with identical fingerprints; and performing, in the to-be-reduced data block based on the fingerprint of the to-be-reduced data block, data reduction processing on a data block to which index information in a same index set belongs.

In the solution shown in this disclosure, when there is the to-be-reduced data block, the fingerprint of the to-be-reduced data block is obtained. Then, identical fingerprints in fingerprints of to-be-reduced data blocks are determined, and the index set is formed by using the index information of the data blocks with identical fingerprints. For any index set, data blocks to which index information in the index set belongs are determined, and data reduction processing is performed on the data blocks to which the index information in the index set belongs. In this way, because the index set is formed by using the index information of the data blocks with when the data blocks with identical fingerprints are searched for identical fingerprints, subsequently, one index set may be directly obtained, and it is not necessary to search all fingerprints. Therefore, data reduction efficiency can be improved.

In a possible implementation, the forming an index set by using index information of data blocks with identical fingerprints in the fingerprints includes: forming, in the to-be-reduced data block based on a log-structured merge (LSM) tree and/or a key-value pair (K-V) tree, the index set by using the index information of the data blocks with identical fingerprints.

In the solution shown in this disclosure, when there is only an LSM tree, a structure of the LSM tree includes a multi-level storage structure, namely, a level 0 to a level n. When the index information of the data block is stored in the LSM tree at the beginning, the index information is first stored at the level 0. When the level 0 and a level 1 meet a merging condition, index information at the level 0 is stored to the level 1; in other words, when the level n and a level n+1 meet the merging condition, index information at the level n is stored to the level n+1 (a capacity of the level n is less than a capacity of the level n+1). The data blocks with identical fingerprints may be determined in the to-be-reduced data block by using the LSM tree, and then the index set is formed by using the index information of the data blocks. When there is only a K-V tree, the K-V tree is stored in a form of a key-value pair, and one key-value pair includes one key and one value. The data blocks with identical fingerprints may be determined in the to-be-reduced data block by using the K-V tree, and then the index set is formed by using the index information of the data blocks. When there is an LSM tree and a K-V tree, these two types of trees are separately used to form the index set. In this way, because these two types of trees are used, efficiency of determining the index set can be higher.

In a possible implementation, the fingerprints of the data blocks are similar fingerprints or to-be-deduplicated fingerprints; and when the fingerprints are similar fingerprints, the index information includes an address of the data block, or both an address of the data block and the to-be-deduplicated fingerprint; when the fingerprints are to-be-deduplicated fingerprints, the index information includes an address of the data block.

In a possible implementation, the fingerprints of the data blocks include similar fingerprints and to-be-deduplicated fingerprints. The forming the index set by using the index information of the data blocks with identical fingerprints includes: forming a first index set by using first index information of the data blocks with identical similar fingerprints, and forming a second index set by using second index information of the data blocks with identical to-be-deduplicated fingerprints, where the first index information includes an address of the data block, and the second index information includes an address of the data block; or forming a third index set by using third index information of the data blocks with identical similar fingerprints, where the third index information includes an address of the data block and the to-be-deduplicated fingerprint.

In the solution shown in this disclosure, when the fingerprints of the data blocks include similar fingerprints and to-be-deduplicated fingerprints, the first index information of data blocks with identical similar fingerprints may be determined, and the first index set is formed by using the first index information; the second index information of data blocks with identical to-be-deduplicated fingerprints may be determined, and the second index set is formed by using the second index information. In this way, a data block on which data deduplication can be performed can be determined, and a data block on which similarity deduplication can be performed can also be determined. Alternatively, the third index information of the data blocks with identical similar fingerprints may be determined, and the third index set is formed by using the third index information, where the third index information includes an address of the data block and the to-be-deduplicated fingerprint. In this way, a data block on which data deduplication can be performed and a data block on which similarity deduplication can be performed can be determined simultaneously.

In a possible implementation, the forming, in the to-be-reduced data block based on an LSM tree, the index set by using the index information of the data blocks with identical fingerprints includes: when a merging condition of a level n and a level n+1 of the LSM tree is met, merging, in the to-be-reduced data block, index information of the data blocks with identical fingerprints at the level n and the level n+1 into the level n+1, and forming, after the index information is merged into the level n+1, the index set by using the index information of the data blocks with identical fingerprints, where n is a natural number.

The merging condition is that a capacity of the level n reaches a specified maximum capacity of the level n, file distribution meets a specific condition, or the like. That file distribution meets a specific condition means that there is a plurality of data blocks with identical similar fingerprints and/or a plurality of data blocks with identical to-be-deduplicated fingerprints in a file. Certainly, the merging condition may be another condition, and is not limited to content listed above.

In the solution shown in this disclosure, when the index set is formed by using the LSM and the index information of the data blocks with identical fingerprints, a data amount of data at the level n may be periodically detected, to determine whether the data amount at the level n reaches the specified maximum capacity of the level n, and whether the file distribution meets the specific condition may be periodically detected. If the specified maximum capacity is reached or the file distribution meets the specific condition, it is determined that the merging condition is met, index information of data blocks stored at the level n may be merged into the level n+1, and after the index information is merged into the level n+1, the index set is formed by using the index information of the data blocks with identical fingerprints. In this way, the index information of the data blocks with identical fingerprints is stored at adjacent locations during merging, and it is more convenient to form the index set.

In a possible implementation, when the index set is formed, in the to-be-reduced data block based on the LSM tree and the K-V tree, by using the index information of the data blocks with identical fingerprints, the performing, based on the fingerprint of the to-be-reduced data block, data reduction processing on a data block to which index information in a same index set belongs includes: when a load of a processing device that performs the method is greater than or equal to a first value, performing, based on the fingerprint of the to-be-reduced data block in the LSM tree, data reduction processing on the data block to which the index information in the same index set belongs; when the load of the processing device is less than the first value or the to-be-reduced data block corresponds to a target identifier, performing, based on the fingerprint of the to-be-reduced data block in the K-V tree, data reduction processing on the data block to which the index information in the same index set belongs, where the target identifier is used to indicate to perform reduction processing on the data block in real time.

In the solution shown in this disclosure, it may be determined whether the to-be-reduced data block corresponds to the target identifier, the target identifier is used to indicate to perform reduction processing on the data block in real time, and real-time reduction processing means to perform data reduction processing if data is written in a storage system of the processing device. When the to-be-reduced data block corresponds to the target identifier, it may be determined to perform real-time reduction processing on the to-be-reduced data block. The processing device may perform, by using the fingerprint of the to-be-reduced data block in the K-V tree, data reduction processing on the data block to which the index information in the same index set belongs. When the to-be-reduced data block does not correspond to the target identifier, the load of the processing device may be periodically obtained, and the processing device determines a magnitude of the load and a magnitude of the first value. If the load is greater than or equal to the first value, data reduction processing may be performed, by using the fingerprint of the to-be-reduced data block in the LSM tree, on the data block to which the index information in the same index set belongs. If the load is less than the first value, data reduction processing may be performed, by using the fingerprint of the to-be-reduced data block in the K-V tree, on the data block to which the index information in the same index set belongs. In this way, when the LSM tree is used, the index set can be obtained only through merging. However, merging processing is not performed in real time. Therefore, when the load is relatively large or data reduction processing is not required to be performed in real time, the LSM tree may be used. However, when the load is relatively small, resources of the processing device are abundant to support data reduction processing, and therefore, real-time reduction processing may be performed by using the K-V tree; when data reduction processing is required to be performed in real time, the index set may be directly determined by using the K-V tree, and therefore, a real-time requirement can be met.

In a possible implementation, the method further includes: obtaining a load of a processing device that performs the method; and the performing, based on the fingerprint of the to-be-reduced data block, data reduction processing on a data block to which index information in a same index set belongs includes: creating, based on the fingerprint of the to-be-reduced data block, a reduction task for the data block to which the index information in the same index set belongs, and executing the reduction task when the load of the processing device is less than a second value;

when the load of the processing device is less than a second value, creating, based on the fingerprint of the to-be-reduced data block, a reduction task for the data block to which the index information in the same index set belongs, and executing the reduction task.

In the solution shown in this disclosure, after the index information at the level n and the index information at the level n+1 are merged, an index set at the level n+1 may be found. A reduction task is generated based on a fingerprint of each piece of index information in the index set. The currently created reduction task is arranged at the end of a reduction task queue, and a later arrangement location in the reduction task queue lead to later execution of the reduction task. When there is a reduction task in the reduction task queue, a magnitude of the load of the processing device and a magnitude of the second value may be periodically determined. If the load of the processing device is less than the second value, the reduction task is obtained from the reduction task queue and is executed. In this way, when the load is less than a specific value, the data reduction task is executed, and no other service is affected.

Alternatively, the load of the processing device may be obtained, and whether the load is greater than the second value is determined. If the load is greater than or equal to the second value, it is determined not to generate a reduction task for the to-be-reduced data block; or if the load is less than the second value, it is determined to generate a reduction task for the to-be-reduced data block (how to generate the reduction task is described above). In this way, the data reduction task is generated only when the load is relatively small, the reduction task is executed, and no other service is affected.

According to a second aspect, a data reduction apparatus is provided, where the apparatus includes:

an obtaining module, configured to obtain a fingerprint of a to-be-reduced data block;

a determining module, configured to form an index set based on the fingerprint of the to-be-reduced data block by using index information of data blocks with identical fingerprints; and a reduction module, configured to perform, in the to-be-reduced data block based on the fingerprint of the to-be-reduced data block, data reduction processing on a data block to which index information in a same index set belongs.

In a possible implementation, the determining module is configured to:

form, in the to-be-reduced data block based on an LSM tree and/or a K-V tree, the index set by using the index information of the data blocks with identical fingerprints.

In a possible implementation, the fingerprints are similar fingerprints or to-be-deduplicated fingerprints; and when the fingerprints are similar fingerprints, the index information includes an address of the data block, or an address of the data block and the to-be-deduplicated fingerprint; when the fingerprints are to-be-deduplicated fingerprints, the index information includes an address of the data block.

In a possible implementation, the fingerprints include similar fingerprints and to-be-deduplicated fingerprints; and the determining module is configured to:

form a first index set by using first index information of the data blocks with identical similar fingerprints, and form a second index set by using second index information of the data blocks with identical to-be-deduplicated fingerprints, where the first index information includes an address of the data block, and the second index information includes an address of the data block; or form a third index set by using third index information of the data blocks with identical similar fingerprints, where the third index information includes an address of the data block and the to-be-deduplicated fingerprint.

In a possible implementation, the determining module is configured to:

when a merging condition for a level n and a level n+1 of the LSM tree is met, merge, in the to-be-reduced data block, index information of the data blocks with identical fingerprints at the level n and the level n+1 into the level n+1, and after the index information is merged into the level n+1, from the index set by using the index information of the data blocks with identical fingerprints, where n is a natural number.

In a possible implementation, the determining module is configured to:

when a load of a processing device on which the apparatus is deployed is greater than or equal to a first value, perform, based on the fingerprint of the to-be-reduced data block in the LSM tree, data reduction processing on the data block to which the index information in the same index set belongs; or when the load of the processing device is less than the first value or the to-be-reduced data block corresponds to a target identifier, perform, based on the fingerprint of the to-be-reduced data block in the K-V tree, data reduction processing on the data block to which the index information in the same index set belongs, where the target identifier is used to indicate to perform reduction processing on the data block in real time.

In a possible implementation, the obtaining module is further configured to:

obtain a load of a processing device on which the apparatus is deployed; and the reduction module is configured to:

create, based on the fingerprint of the to-be-reduced data block, a reduction task for the data block to which the index information in the same index set belongs, and execute the reduction task when the load of the processing device is less than a second value; or when the load of the processing device is less than a second value, create, based on the fingerprint of the to-be-reduced data block, a reduction task for the data block to which the index information in the same index set belongs, and execute the reduction task.

According to a third aspect, a data reduction apparatus is provided. The apparatus includes an interface and a processor, and the processor is configured to perform the data reduction method described in the first aspect.

According to a fourth aspect, a data reduction computing device is provided, and the computing device includes a processor and a memory.

The memory stores computer instructions.

The processor executes the computer instructions, to perform the data reduction method described in the first aspect.

According to a fifth aspect, a computer-readable storage medium is provided. The computer-readable storage medium stores computer instructions. When the computer instructions in the computer-readable storage medium are executed by a computing device, the computing device is enabled to perform the data reduction method in the first aspect.

DESCRIPTION OF EMBODIMENTS

To make the objectives, technical solutions, and advantages of this disclosure clearer, the following further describes embodiments of this disclosure in detail with reference to the accompanying drawings.

For ease of understanding of embodiments of this disclosure, the following first describes concepts of related nouns.

Data deduplication: When there is a plurality of identical data blocks, only one of the plurality of identical data blocks is stored. For example, one file is segmented into a plurality of data blocks, a to-be-deduplicated fingerprint of each of the plurality of data blocks is calculated, and only one of data blocks with identical to-be-deduplicated fingerprints is stored.

Similarity deduplication: Data blocks with a specific similarity are reduced. For example, because partial content of a data block 1 and a data block 2 is different, data deduplication cannot be performed. However, a similarity between the data block 1 and the data block 2 is very high. In this case, the data block 1 is used as a reference block, and similarity deduplication is performed on the data block 2 with reference to the data block 1. Only a part that is in the data block 2 and that is different from the data block 1 is reserved.

A data reduction method in embodiments of this disclosure may be executed by a data reduction apparatus. The data reduction apparatus may be a hardware apparatus, such as a computing device, a host, or a storage array, or may be a software apparatus (such as a set of software programs that can run on a hardware apparatus).

Figure 1:
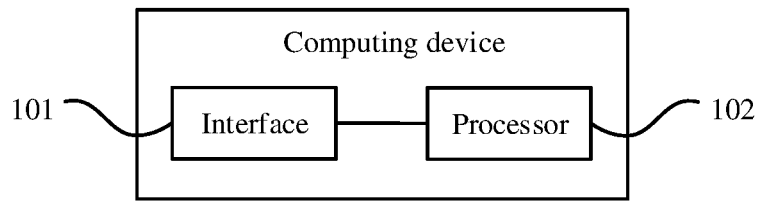
FIG. 1 is a schematic diagram of a structure of a computer device according to an embodiment of this disclosure.

When the data reduction method is performed by the computing device, FIG. 1 is a block diagram of a structure of the computing device according to an embodiment of this disclosure. The computing device may include at least an interface 101 and a processor 102. The interface 101 may be configured to implement data reception. In a specific implementation, the interface 101 may be a hardware interface, for example, a network interface card (NIC) or a host bus adapter (HBA), or may be a program interface module or the like. The processor 102 may be a combination of a central processing unit and a memory, or may be a field programmable gate array (FPGA) or other hardware. The processor 102 may alternatively be a combination of a central processing unit and other hardware, for example, a combination of the central processing unit and an FPGA. The processor 102 may be a control center of the computing device, and is connected to all parts of the entire computing device by using various interfaces and lines. In a possible implementation, the processor 102 may include one or more processing cores. Further, the computing device further includes a hard disk, configured to provide storage space for the computing device.

Figure 2:
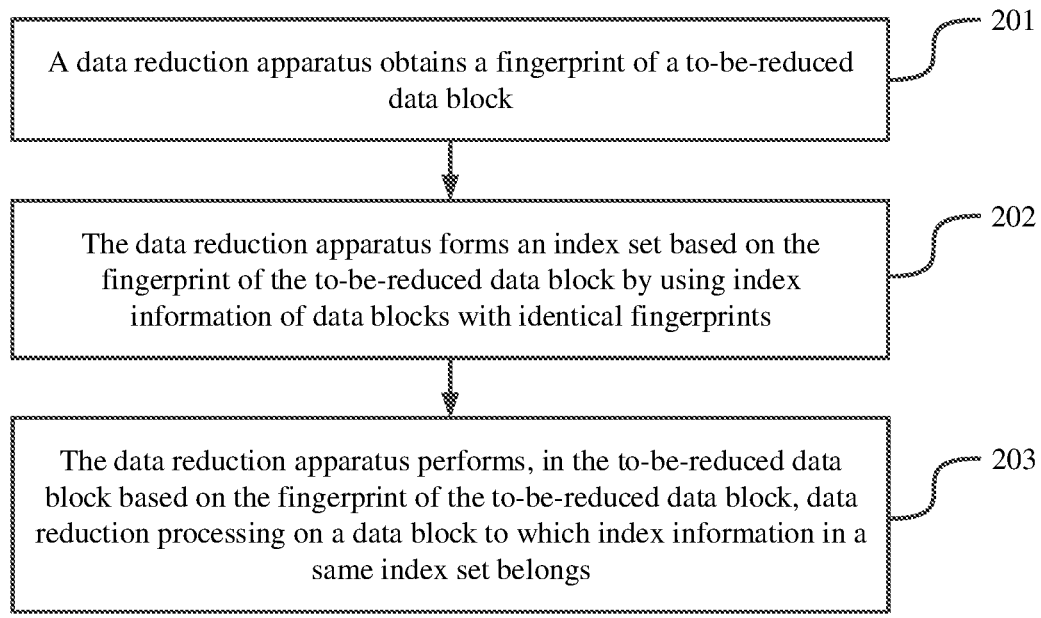
FIG. 2 is a schematic flowchart of a data reduction method according to an embodiment of this disclosure.

This disclosure provides a data reduction method. As shown in FIG. 2, an execution procedure of the method may be as follows:

Step 201: A data reduction apparatus obtains a fingerprint of a to-be-reduced data block.

In this embodiment, the data reduction apparatus determines, in stored data, data on which data reduction is not performed (the data on which data reduction is not performed is data on which data deduplication processing or similarity deduplication processing is not performed), and segments the data on which data reduction is not performed into data blocks, and the data blocks obtained through segmentation are the to-be-reduced data blocks. The data reduction apparatus may obtain the fingerprint of the to-be-reduced data block.

It should be noted that, the fingerprint of the to-be-reduced data block obtained by the data reduction apparatus may be a fingerprint that is of a data block and that is currently determined by the data reduction apparatus, or a fingerprint that is of a stored data block and that is obtained by the data reduction apparatus.

In a possible implementation, manners of segmenting the data on which data reduction is not performed into data blocks include but are not limited to the following several manners:

(1) Fixed-length segmenting manner: To be specific, the data on which data reduction is not performed is segmented into data blocks in a manner in which the data blocks obtained through segmentation have an identical data length. In this way, data length of all the data blocks obtained through segmentation are the same.

(2) Variable-length segmenting manner: To be specific, one or more data blocks in data blocks obtained through segmentation have a data length different from a data length of another data block.

(3) Data content-based variable-length segmenting manner: To be specific, data content is analyzed, and data blocks are obtained through segmentation based on the data content. For example, data with continuous data content of a same type is classified into a data block.

(4) Data block overlapping segmenting manner: To be specific, in adjacent data blocks obtained through segmentation, a data block includes partial content of a previous data block. For example, the data is 123456789, and the data blocks obtained through segmentation are 123, 345, 567, and 789.

(5) Data block non-overlapping segmenting manner: To be specific, in adjacent data blocks obtained through segmentation, a data block does not include partial content of a previous data block. For example, the data is 123456789, and the data blocks obtained through segmentation are 123, 456, and 789.

In a possible implementation, fingerprints may include to-be-deduplicated fingerprints and/or similar fingerprints. Corresponding manners of obtaining the fingerprint of the to-be-reduced data block may be as follows:

A to-be-deduplicated fingerprint of the to-be-reduced data block is determined: For any to-be-reduced data block, partial content or all content of the data block is processed in any manner including but not limited to a message-digest algorithm (md5), a secure hash algorithm1 (sha-1), or xxhash, to obtain a to-be-deduplicated fingerprint of the data block.

A similar fingerprint of the to-be-reduced data block is determined: For any to-be-reduced data block, the data reduction apparatus intercepts content of the data block by using a sliding window (for example, the sliding window is 8 bits, the sliding window intercepts bits 1 to 8 of the data block in a first time, and the sliding window intercepts bits 2 to 9 in a second time), calculates Rabin hash to obtain a Rabin hash value, selects random prime numbers mi and ai to perform permutation mapping on the Rabin hash value again, and uses a maximum value (or a minimum value) as an eigenvalue corresponding to the random prime numbers. In this case, the eigenvalue is a similar fingerprint of the data block. For example, a specific formula may be: An eigenvalue i is: $Max_{j=1}^{N}\{(mi*Rabin(Wj)+ai) mod2^{32}\}$, where N indicates a quantity of times that the sliding window slides to intercept the content of the data block, Wj is content intercepted in a $j^{th}$ time, Rabin(Wj) is a Rabin hash value of the intercepted content Wj in the data block, $Max_{j=1}^{N}\{\}$ indicates a maximum value obtained after content intercepted in N times is processed by using a method in { }, "*" indicates multiplication, mi and ai are the random prime numbers, and $mod2^{32}$ indicates using $2^{32}$ as a modulo. This manner is only an implementation, and this is not limited to this manner.

It should be noted that, Rabin hash is a hash manner, where Rabin is a name of a person who invents this hash manner.

In a possible implementation, the data reduction apparatus may determine a plurality of eigenvalues by using a plurality of groups of random prime numbers. The data reduction apparatus may merge the plurality of eigenvalues into a super fingerprint, and determines the super fingerprint as the similar fingerprint of the data block. A specific formula is: The super fingerprint is: Rabin (eigenvalue 1, eigenvalue 2, . . . , eigenvalue n). Because the super fingerprint is obtained by using the plurality of eigenvalues, accuracy of finding similar data blocks can be improved.

Step 202: The data reduction apparatus forms an index set based on the fingerprint of the to-be-reduced data block by using index information of data blocks with identical fingerprints.

In this embodiment, the data reduction apparatus may determine the data blocks with identical fingerprints from the to-be-reduced data block, and form the index set by using the index information of the data blocks with identical fingerprints. The index information may include a current address of the data block, the address is used to indicate a location at which the data block is currently stored, and the address may be a logical block address (LBA).

Step 203: The data reduction apparatus performs, in the to-be-reduced data block based on the fingerprint of the to-be-reduced data block, data reduction processing on a data block to which index information in a same index set belongs.

In this embodiment, the data reduction apparatus may determine, in the to-be-reduced data block based on the fingerprint of the to-be-reduced data block, the data block to which the index information in the same index set belongs. Then, the data reduction apparatus performs data reduction processing on the data block to which the index information in the same index set belongs.

It should be noted that, a plurality of index sets may be determined in step 202. For each index set, fingerprints of data blocks to which index information included in the index set belongs are identical. In this way, in step 203, the same index set means belonging to the same index set, and the index information in the same index set means index information that belongs to the same index set.

Figure 3:
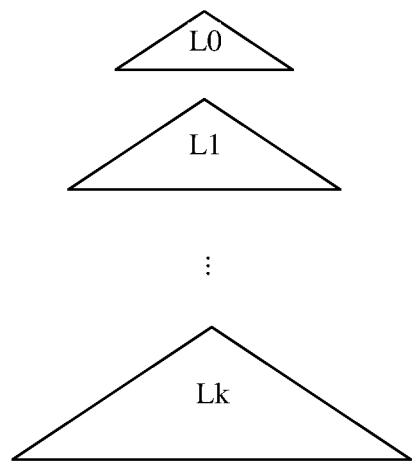
FIG. 3 is a schematic diagram of a structure of an LMS tree according to an embodiment of this disclosure.

In a possible implementation, when implementing step 202, the data reduction apparatus may form, in to-be-reduced data block by using an LSM tree and/or a K-V tree, the index set by using the index information of the data blocks with identical fingerprints. Descriptions are as follows:

(1) When there is only an LSM tree, as shown in FIG. 3, a structure of the LSM tree includes a multi-level storage structure (for example, seven levels in total): a level 0 to a level k. When the index information of the data block is stored in the LSM tree at the beginning, the index information is first stored at the level 0. When the level 0 and a level 1 meet a merging condition, the data reduction apparatus stores index information at the level 0 to the level 1; in other words, when a level n (n is less than k) and a level n+1 meet the merging condition, the data reduction apparatus stores index information at the level n to the level n+1 (a capacity of the level n is less than a capacity of the level n+1).

The data reduction apparatus may determine the data blocks with identical fingerprints from the to-be-reduced data block by using the LSM tree, and then form the index set by using the index information of the data blocks.

(2) When there is only a K-V tree, the K-V tree is stored in a form of a key-value pair, and one key-value pair includes one key and one value. The data reduction apparatus may determine the data blocks with identical fingerprints from the to-be-reduced data block by using the K-V tree, and then form the index set by using the index information of the data blocks.

(3) When there is an LSM tree and a K-V tree, the LSM tree and the K-V tree may be used at the same time, and the index set is formed by using the index information of the data blocks with identical fingerprints. For a manner of using the LSM tree, refer to the descriptions in (1). For a manner of using the K-V tree, refer to the descriptions in (2).

It should be noted that, when the LSM tree and/or the K-V tree are/is used, the fingerprints of the data blocks are similar fingerprints or to-be-deduplicated fingerprints. When the fingerprints are similar fingerprints, the index information may be indicated by using a key-value pair. A key is the similar fingerprint of the data block, and a value is an address of the data block; or a key is the similar fingerprint of the data block, and a value is the address of the data block and the to-be-deduplicated fingerprint. When the fingerprints are to-be-deduplicated fingerprints, the index information may also be indicated by using a key-value pair. A key is the to-be-deduplicated fingerprint of the data block, and a value is an address of the data block.

In a possible implementation, when step 202 is implemented, and when the fingerprints of the data blocks include similar fingerprints and to-be-deduplicated fingerprints, processing of forming the index set by using the index information of the data blocks with identical fingerprints is:

Manner 1: A first index set is formed by using first index information of data blocks with identical similar fingerprints, and a second index set is formed by using second index information of data blocks with identical to-be-deduplicated fingerprints, where the first index information includes an address of the data block, and the second index information includes an address of the data block.

In this embodiment, when the fingerprints of the data blocks include similar fingerprints and to-be-deduplicated fingerprints, the data reduction apparatus determines the data blocks with identical similar fingerprints, and forms the first index set by using the first index information of the data blocks. The first index information is indicated by using a key-value pair, a key is the similar fingerprint of the data block, and a value is the address of the data block; or the key is the similar fingerprint of the data block, and the value is the address of the data block and the to-be-deduplicated fingerprints.

The data reduction apparatus determines the data blocks with identical to-be-deduplicated fingerprints, and forms the second index set by using the second index information of the data blocks. The second index information is indicated by using a key-value pair, a key is the to-be-deduplicated fingerprint of the data block, and a value is an address of the data block.

Manner 2: A third index set is formed by using third index information of the data blocks with identical similar fingerprints, where the third index information includes an address of the data block and to-be-deduplicated fingerprint.

In this embodiment, when the fingerprints of the data blocks include similar fingerprints and to-be-deduplicated fingerprints, the data reduction apparatus determines data blocks with identical similar fingerprints, and forms the third index set by using the third index information of the data blocks. The third index information is indicated by using a key-value pair, a key is the similar fingerprint of the data block, and a value is the address of the data block and the to-be-deduplicated fingerprints. A reason why the third index set can be formed is: When to-be-deduplicated fingerprints of any two data blocks are identical, similar fingerprints of the two data blocks are definitely identical. Therefore, the third index set may be formed by using the third index information of the data blocks with identical similar fingerprints, and the third index set includes both data blocks with identical similar fingerprints and data blocks with identical to-be-deduplicated fingerprints.

In a possible implementation, processing of the forming, in the fingerprint of the to-be-reduced data block based on an LSM tree, the index set by using the index information of the data blocks with identical fingerprints may be:

when a merging condition for a level n and a level n+1 of the LSM tree is met, merging, in an index of the to-be-reduced data block, index information of data blocks with identical fingerprints at the level n and the level n+1 into the level n+1, and after the index information is merged into the level n+1, forming the index set by using the index information of the data blocks with identical fingerprints, where n is a natural number.

The merging condition is that a capacity of the level n reaches a specified maximum capacity of the level n, file distribution meets a specific condition, or the like. That file distribution meets a specific condition means that there is a plurality of data blocks with identical similar fingerprints and/or a plurality of data blocks with identical to-be-deduplicated fingerprints in a file. Certainly, the merging condition may be another condition, and is not limited to content listed above.

In this embodiment, the data reduction apparatus may periodically detect a data amount of data at the level n and whether there is a plurality of data blocks with identical similar fingerprints and/or a plurality of data blocks with identical to-be-deduplicated fingerprints at the level n and the level n+1, and determine whether the data amount at the level n reaches the specified maximum capacity of the level n. If the specified maximum capacity is reached, and/or there is a plurality of data blocks with identical similar fingerprints and/or a plurality of data blocks with identical to-be-deduplicated fingerprints at the level n and the level n+1 (in other words, the file distribution meets the specific condition), the data reduction apparatus may merge index information of data blocks stored at the level n into the level n+1.

Figure 4:
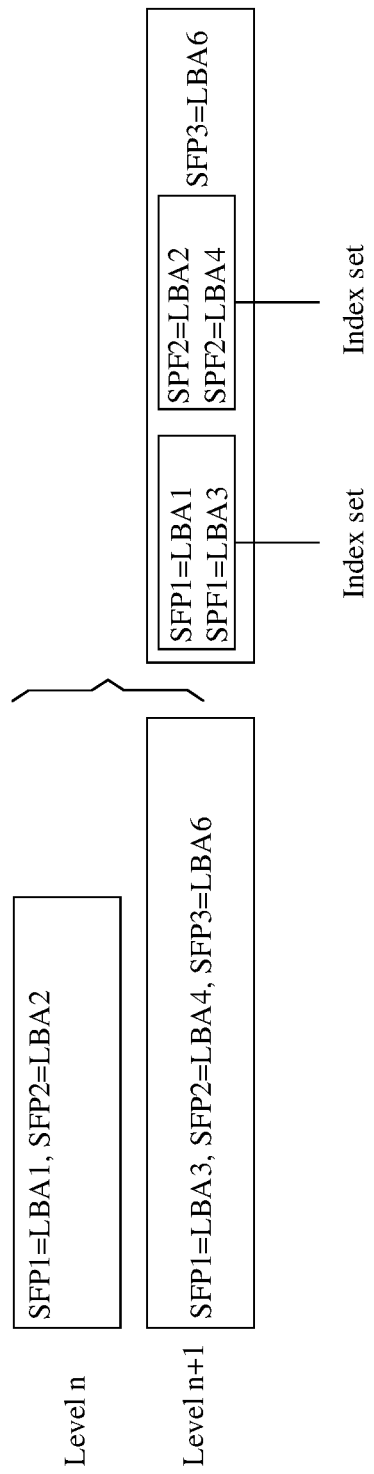
FIG. 4 is a schematic diagram of a merged structure of a level n and a level n+1 in an LSM tree according to an embodiment of this disclosure.
Figure 5:
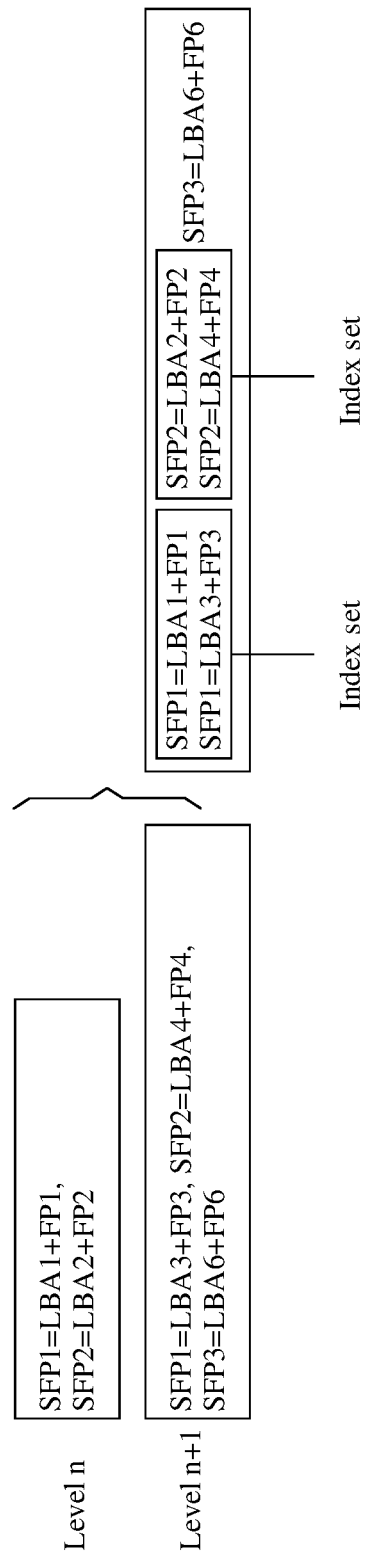
FIG. 5 is a schematic diagram of a merged structure of a level n and a level n+1 in an LSM tree according to an embodiment of this disclosure.

Specifically, the fingerprints of the data blocks include similar fingerprints and/or deduplicated fingerprints. When the fingerprints of the data blocks include similar fingerprints, the data reduction apparatus may determine whether there is, at the level n, first index information of a data block with an identical similar fingerprint as the level n+1. When there is the first index information of the data block with the identical similar fingerprint, the first index information of the data block at the level n is merged with first index information of a data block with an identical similar fingerprint at the level n+1, to form an index set that may be referred to as the first index set. As shown in FIG. 4, the first index information is indicated by using a key-value pair, a key is the similar fingerprint of the data block, and a value is the address of the data block. There is SFP1=LBA1 and SFP2=LBA2 at the level n. There is SFP1=LBA3, SFP2=LBA4, and SFP3=LBA6 at the level n+1. When the level n is merged into the level n+1, SFP1=LBA1 and SFP1=LBA3 form an index set, and SFP2=LBA2 and SFP2=LBA4 form an index set. As shown in FIG. 5, the first index information is indicated by using a key-value pair, a key is the similar fingerprint of the data block, and a value is the address and the to-be-deduplicated fingerprint of the data block. There is SFP1=LBA1+FP1 and SFP2=LBA2+FP2 at the level n. There is SFP1=LBA3+FP3, SFP2=LBA4+FP4, and SFP3=LBA6+FP6 at the level n+1. When the level n is merged into the level n+1, SFP1=LBA1+FP1 and SFP1=LBA3+FP3 form an index set, and SFP2=LBA2+FP2 and SFP2=LBA4+FP4 form an index set.

Figure 6:
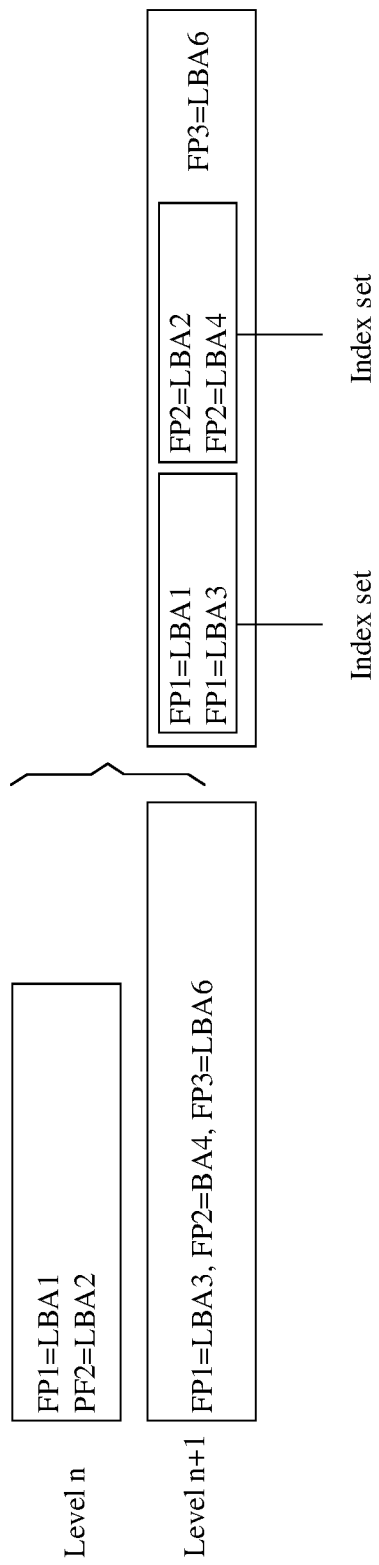
FIG. 6 is a schematic diagram of a merged structure of a level n and a level n+1 in an LSM tree according to an embodiment of this disclosure.

When the fingerprints of the data blocks include to-be-deduplicated fingerprints, the data reduction apparatus may determine whether there is, at the level n, second index information of a data block with the identical to-be-deduplicated fingerprint as the level n+1. When there is the second index information of the data block with an identical to-be-deduplicated fingerprint, the second index information of the data block at the level n is merged with second index information of a data block with an identical to-be-deduplicated fingerprint at the level n+1, to form an index set that may be referred to as the second index set. As shown in FIG. 6, the second index information is indicated by using a key-value pair, a key is the to-be-deduplicated fingerprint of the data block, and a value is an address of the data block. There is FP1=LBA1 and FP2=LBA2 at the level n. There is FP1=LBA3, FP2=LBA4, and FP3=LBA6 at the level n+1. When the level n is merged into the level n+1, FP1=LBA1 and FP1=LBA3 form an index set, and FP2=LBA2 and FP2=LBA4 form an index set.

When the fingerprints of the data blocks include similar fingerprints and to-be-deduplicated fingerprints, and when the data reduction apparatus merges the level n into the level n+1, index information of the data block is indicated by using a key-value pair. When a key is a similar fingerprint of the data block, a value is an address of the data block (the index information is the first index information). When the key is a to-be-deduplicated fingerprint, the value is an address of the data block (the index information is the second index information). In this way, when the data reduction apparatus merges index information of the data block at the level n into the level n+1, the first index information of the data block at the level n is merged with the first index information of the data block with the identical similar fingerprint at the level n+1, to form an index set that may be referred to as the first index set, and the second index information of the data block at the level n is merged with the second index information of the data block with the identical to-be-deduplicated fingerprint at the level n+1, to form an index set that may be referred to as the second index set. In this way, an index set is formed by using index information of data blocks with identical similar fingerprints, so that it is easy to find the data blocks with identical similar fingerprints. An index set is formed by using index information of data blocks with identical to-be-deduplicated fingerprints, so that it is easy to find the data blocks with identical to-be-deduplicated fingerprints.

Alternatively, when the fingerprints of the data blocks include similar fingerprints and to-be-deduplicated fingerprints, index information of the data block (the index information may be the third index information) is indicated by using a key-value pair, a key is a similar fingerprint of the data block, and a value is an address and a to-be-deduplicated fingerprint of the data block. The data reduction apparatus may determine whether there is, at the level n, third index information of a data block with an identical similar fingerprint as the level n+1. When there is the third index information of the data block with the identical similar fingerprint, the third index information of the data block at the level n is merged with third index information of a data block with an identical similar fingerprint at the level n+1, to form an index set that may be referred to as the third index set. In this way, one piece of index information may include both a similar fingerprint and a to-be-deduplicated fingerprint. In addition, for two data blocks with identical to-be-deduplicated fingerprints, similar fingerprints of the two data blocks are definitely identical. Therefore, the similar fingerprint of the data block may be used as a key, and an address of the data block and the to-be-deduplicated fingerprint may be used as the value. In this way, an index set is formed by using index information of data blocks with identical similar fingerprints, so that it is easy to find the data blocks with identical similar fingerprints. In addition, the index information includes to-be-deduplicated fingerprints, so that data blocks with identical to-be-deduplicated fingerprints can also be quickly found.

It should be noted that, when the index information at the level n is merged into the level n+1, all the index information at the level n may be merged into the level n+1, or only the index information of the data blocks with identical fingerprints may be merged into the level n+1. This is not limited in this embodiment of this disclosure.

It should also be noted that, "first" in the first index information, "second" in the second index information, and "third" in the third index information are merely used to distinguish different index information of data blocks.

In a possible implementation, processing of the forming, in the fingerprint of the to-be-reduced data block based on a K-V tree, the index set by using the index information of the data blocks with identical fingerprints may be:

In the to-be-reduced data block, a similar fingerprint of the data block is used as a unique identifier of a node of the K-V tree, or a to-be-deduplicated fingerprint of the data block is used as a unique identifier of a node of the K-V tree. Specifically, when index information is stored by using the K-V tree, storing may be performed in a manner not limited to using a binary tree.

When the similar fingerprint of the data block is used as the unique identifier of the node of the K-V tree, each node includes index information of any to-be-reduced data block. The index information is indicated by using a key-value pair, a key of the key-value pair is the similar fingerprint of the data block, and a value of the key-value pair is an address of the data block and a to-be-deduplicated fingerprint, or a value of the key-value pair is an address of the data block.

When the to-be-deduplicated fingerprint of the data block is used as the unique identifier of the node of the K-V tree, each node includes index information of any to-be-reduced data block. The index information is indicated by using a key-value pair, a key of the key-value pair is the to-be-deduplicated fingerprint of the data block, and a value of the key-value pair is an address of the data block.

It should be noted that, when the fingerprints of the data blocks include to-be-deduplicated fingerprints and similar fingerprints, two K-V trees may be created: one K-V tree for creating the similar fingerprints, and one K-V tree for creating the to-be-deduplicated fingerprints. Certainly, one K-V tree may alternatively be created, and only the K-V tree of the similar fingerprints is created, except that a value of a key-value pair of the index information includes a to-be-deduplicated fingerprint and an address of the data block.

Figure 7:
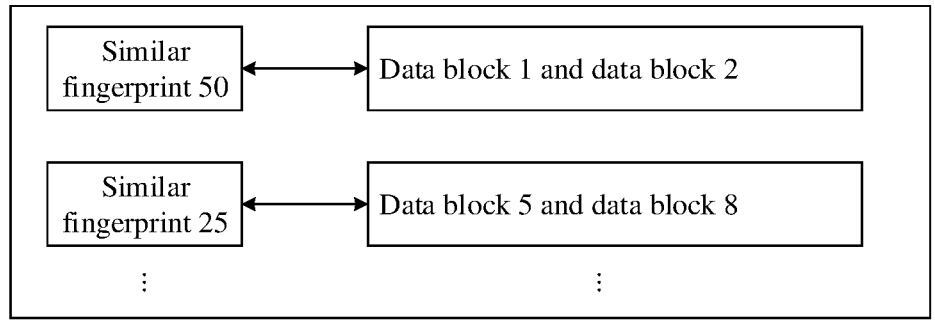
FIG. 7 is a schematic diagram of a structure of a K-V tree according to an embodiment of this disclosure.
Figure 8:
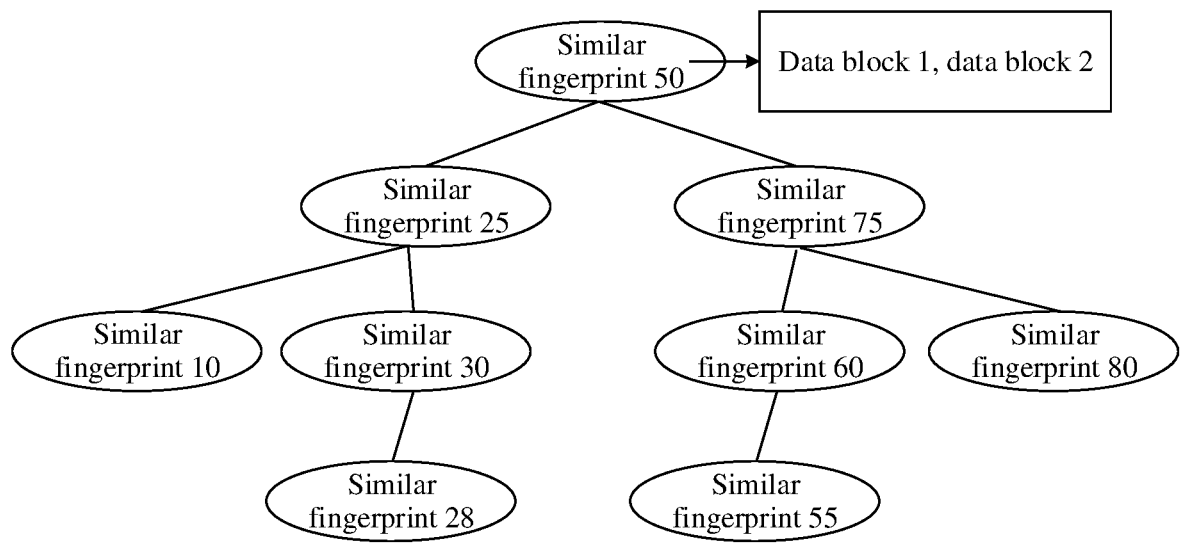
FIG. 8 is a schematic diagram of a structure of a K-V tree according to an embodiment of this disclosure.

It should also be noted that, the K-V tree actually stores the index information of the data block. For example, as shown in FIG. 7, a key of a key-value pair of index information is a similar fingerprint of a data block, and a value of the key-value pair includes a to-be-deduplicated fingerprint and an address of the data block. When the similar fingerprint is 50, the value is to-be-deduplicated fingerprints and addresses of a data block 1 and a data block 2, and when the similar fingerprint is 25, the value is to-be-deduplicated fingerprints and addresses of a data block 5 and a data block 8. The data reduction apparatus may create the K-V tree by using a binary tree. For example, as shown in FIG. 8, a similar fingerprint that is of any to-be-reduced data block and that is obtained by the data reduction apparatus is equal to 50 (data blocks whose similar fingerprints are equal to 50 are a data block 1 and a data block 2). On a left side of a level 2 of the binary tree, a similar fingerprint is less than 50, and on a right side of the binary tree, a similar fingerprint is greater than 50. A distribution manner of a level 3 of the binary tree is same as that of the level 2. Certainly, the K-V tree may alternatively be created in another manner. This is not limited in this embodiment of this disclosure.

In a possible implementation, in step 203, when there are both the LSM tree and the K-V tree, the data reduction apparatus may determine, based on a current load state or another condition, to use the LSM tree or the K-V tree. Corresponding processing may be as follows:

When a load of a processing device that performs the method is greater than or equal to a first value, data reduction processing is performed, based on the fingerprint of the to-be-reduced data block in the LSM tree, on the data block to which the index information in the same index set belongs. When the load of the processing device is less than the first value or the to-be-reduced data block corresponds to a target identifier, data reduction processing is performed, based on the fingerprint of the to-be-reduced data block in the K-V tree, on the data block to which the index information in the same index set belongs. The target identifier is used to indicate to perform reduction processing on the data block in real time.

In this embodiment, the data reduction apparatus may determine whether the to-be-reduced data block corresponds to the target identifier, the target identifier is used to indicate to perform reduction processing on the data block in real time, and real-time reduction processing means to perform data reduction processing when data is written in a storage system of the processing device. When the to-be-reduced data block corresponds to the target identifier, it may be determined to perform real-time reduction processing on the to-be-reduced data block. The data reduction apparatus may perform, by using the fingerprint of the to-be-reduced data block in the K-V tree, data reduction processing on the data block to which the index information in the same index set belongs.

When the to-be-reduced data block does not correspond to the target identifier, a module configured to obtain the load of the processing device is disposed in the data reduction apparatus (when the data reduction apparatus is a hardware apparatus, the data reduction apparatus is the processing device, and when the data reduction apparatus is a software apparatus, the data reduction apparatus is deployed on the processing device), and the data reduction apparatus may periodically obtain the load of the processing device, to determine a magnitude of the load and a magnitude of the first value. When the load is greater than or equal to the first value, the data reduction apparatus may perform, by using the fingerprint of the to-be-reduced data block in the LSM tree, data reduction processing on the data block to which the index information in the same index set belongs.

When the load is less than the first value, the data reduction apparatus may perform, by using the fingerprint of the to-be-reduced data block in the K-V tree, data reduction processing on the data block to which the index information in the same index set belongs.

It should be noted that, a reason why this case occurs is: When the LSM tree is used, the index set can be obtained only through merging. However, merging processing is not performed in real time. Therefore, when the load is relatively large or data reduction processing is not required to be performed in real time, the LSM tree may be used. However, when the load is relatively small, resources of the processing device are abundant to support data reduction processing, and therefore, real-time reduction processing may be performed by using the K-V tree; when data reduction processing is required to be performed in real time, the index set may be directly determined by using the K-V tree, and therefore, a real-time requirement can be met.

It should also be noted that, for the load of the above processing device, there may be two cases. One case is: An application and the storage system run on a same processing device. In this case, when the load of the processing device is calculated, one or more of current CPU usage, memory usage, a quantity of input/output queues, or a quantity of waiting threads of the processing device need to be obtained. The quantity of input/output queues may be a sum of a quantity of queues of data written to the storage system and a quantity of queues of data read from the storage system, and the quantity of waiting threads is a sum of a quantity of threads waiting to be executed of the application and a quantity of threads waiting to be executed of the storage system. The other case is: The application and the storage system run on different processing devices, and the current storage system runs on the processing device. In this case, when the load of the processing device is calculated, one or more of current CPU usage, memory usage, a quantity of input/output queues, or a quantity of waiting threads of the processing device need to be obtained. The quantity of input/output queues may be a sum of a quantity of queues of data written to the storage system and a quantity of queues of data read from the storage system, and the quantity of waiting threads is a quantity of threads waiting to be executed of the storage system.

Then, the data reduction apparatus may perform weighting processing on the CPU usage, the memory usage, the quantity of input/output queues, and the quantity of waiting threads, to obtain the load of the processing device. A specific formula may be: The load of the processing device=$a*x+b*y+c*z+d*r$, where a, b, c, and d are respectively a weight of the CPU usage, a weight of the memory usage, a weight of the quantity of input/output queues, and a weight of the quantity of waiting threads, a sum of a, b, c, and d is equal to 1, and x, y, z, and r are respectively the CPU usage, the memory usage, the quantity of input/output queues, and the quantity of waiting threads. Certainly, the load of the processing device may alternatively be calculated in another manner.

In a possible implementation, in step 203, the data reduction apparatus may generate a reduction task for data reduction processing, and determine, based on the load of the processing device, whether to execute the reduction task. A processing manner may be as follows:

The data reduction apparatus obtains a load of a processing device that performs the method. A reduction task for the data block to which the index information in the same index set belongs is created based on the fingerprint of the to-be-reduced data block. When the load of the processing device is less than a second value, the reduction task is executed.

In this embodiment, the data reduction apparatus may obtain the load of the processing device, and a process of obtaining the load is described above.

After merging the index information at the level n with index information at the level n+1, the data reduction apparatus may search for an index set at the level n+1. A reduction task is generated based on a fingerprint of each piece of index information in the index set. The data reduction apparatus arranges a currently generated reduction task at the end of a reduction task queue, and a later arrangement location in the reduction task queue lead to later execution of the reduction task.

When there is a reduction task in the reduction task queue, the data reduction apparatus may periodically determine a magnitude of the load of the processing device and a magnitude of the second value. When the load of the processing device is less than the second value, the data reduction apparatus obtains the reduction task from the reduction task queue and executes the reduction task. When a reduction task includes both data deduplication and similarity deduplication, the data deduplication may be preferentially performed, and after the data deduplication is completed, the similarity deduplication is performed, to achieve a greater reduction gain. Certainly, when a reduction task includes both data deduplication and similarity deduplication, the data deduplication and the similarity deduplication may be performed simultaneously. In this way, whether to execute the reduction task is determined by determining the load of the processing device, and a data reduction policy may be adaptively adjusted based on the load of the processing device. In addition, when the storage system and the application are deployed on a same processing device, the load of the processing device is determined, and therefore, when a quantity of services of the application is relatively large (for example, the load of the processing device exceeds the second value), the reduction task is not executed, so that the service is not affected.

Figure 9:
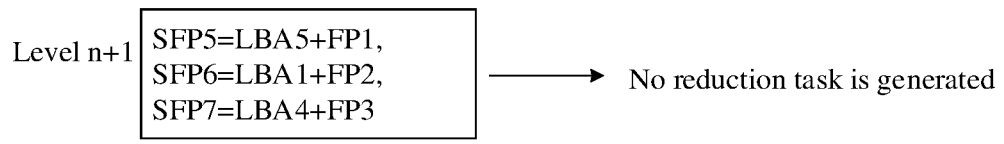
FIG. 9 is a schematic diagram of generating a reduction task according to an embodiment of this disclosure.

It should be noted that, when the reduction task is generated as described above, the reduction task may be generated in the following manner (an example in which a key of a key-value pair of the index information is a similar fingerprint, and a value is an address and a to-be-deduplicated fingerprint of a data block):

After merging the index information at the level n with index information at the level n+1, the data reduction apparatus may search for an index set at the level n+1. When there is only one piece of index information in each index set at the level n+1, the reduction task is not generated. For example, as shown in FIG. 9, index information at the level n+1 includes SFP5=LBA5+FP1, SFP6=LBA1+FP2, and SFP7=LBA4+FP3 (the key (namely, the similar fingerprint) is located before an equal sign, and the value (namely, the address and the to-be-deduplicated fingerprint) is located after the equal sign). Because each index set includes only one piece of index information, the reduction task is not generated.

Figure 10:
FIG. 10 is a schematic diagram of generating a reduction task according to an embodiment of this disclosure.

When an index set in index sets at the level n+1 does not include only one piece of index information, the reduction task may be generated. For example, as shown in FIG. 10, a specific index set at the level n+1 includes three pieces of index information. The three pieces of index information are separately: SFP5=LBA5+FP1, SFP5=LBA4+FP2, and SFP5=LBA3+FP9. A reduction task generated by using the three pieces of index information is: SFP5=FP1(LBA5)+FP2(LBA4)+FP9(LBA3), and two reduction tasks for similarity deduplication are generated. This indicates that data reduction (namely, similarity deduplication) is performed, with reference to a data block to which FP1(LBA5) belongs, on data blocks to which FP2(LBA4) and FP9(LBA3) belong.

Figure 11:
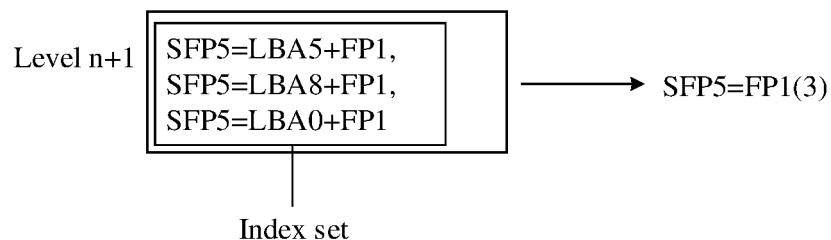
FIG. 11 is a schematic diagram of generating a reduction task according to an embodiment of this disclosure.

For example, as shown in FIG. 11, a specific index set at the level n+1 includes three pieces of index information. The three pieces of index information are separately: SFP5=LBA5+FP1, SFP5=LBA8+FP1, and SFP5=LBA0+FP1. A reduction task generated by using the three pieces of index information is: SFP5=FP1(3), and two reduction tasks for data deduplication are generated. FP1(3) indicates that data deduplication processing is performed twice (that is, (3-1) times). Data reduction (namely, data deduplication) is performed, with reference to a data block to which FP1(LBA5) belongs, on a data block to which LBA8 belongs and a data block to which LBA0 belongs.

Figure 12:
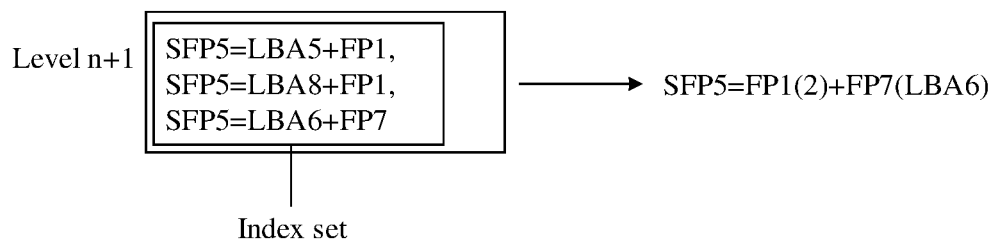
FIG. 12 is a schematic diagram of generating a reduction task according to an embodiment of this disclosure.

For another example, as shown in FIG. 12, a specific index set at the level n+1 includes three pieces of index information. The three pieces of index information are separately: SFP5=LBA5+FP1, SFP5=LBA8+FP1, and SFP5=LBA6+FP7. A reduction task generated by using the three pieces of index information is: SFP5=FP1(2)+FP7 (LBA6), and one reduction task for similarity deduplication and one reduction task for data deduplication are generated. FP1(2) indicates that data deduplication processing is performed once (that is, (2-1) time). Data reduction (namely, data deduplication) is performed, with reference to a data block to which FP1(LBA5) belongs, on a data block to which LBA8+FP1 belongs. Data reduction (namely, similarity deduplication) is performed, with reference to the data block to which FP1(LBA5) belongs, on a data block to which LBA6+FP7 belongs.

Figure 13:
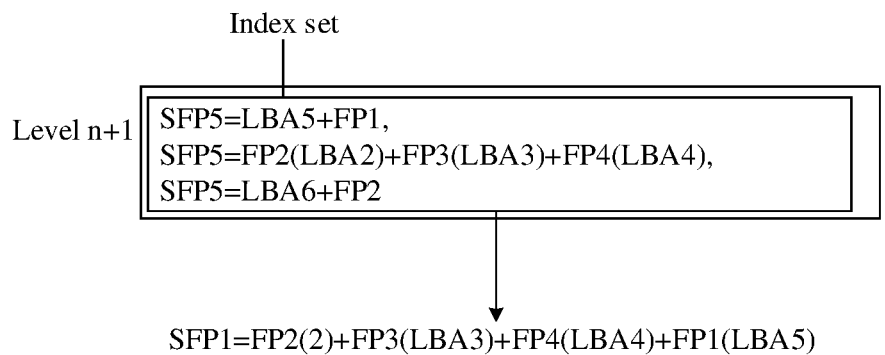
FIG. 13 is a schematic diagram of generating a reduction task according to an embodiment of this disclosure.

For another example, as shown in FIG. 13, a specific index set at the level n+1 includes three pieces of index information. The three pieces of index information are separately: SFP5=LBA5+FP1, SFP5=FP2(LBA2)+FP3 (LBA3)+FP4(LBA4), and SFP5=LBA6+FP2. A reduction task generated by using the three pieces of index information is: SFP1=FP2(2)+FP3(LBA3)+FP4(LBA4)+FP1(LBA5), and two reduction tasks (one reduction task for similarity deduplication and one reduction task for deduplication) are generated. FP2(2) indicates that data deduplication processing is performed once (that is, (2-1) time). Data reduction (namely, similarity deduplication) is performed, with reference to a data block to which FP2(LBA2) belongs, on a data block to which FP1(LBA5) belongs. Data reduction (namely, data deduplication) is performed, with reference to the data block to which FP2(LBA2) belongs, on a data block to which FP2(LBA6) belongs. In this manner, a quantity of reference blocks can be reduced because existing merging records are preferentially reused to generate the reduction task.

Data reduction has been performed on FP3(LBA3) and FP4(LBA4) herein in a previous data reduction task, and FP3(LBA3) and FP4(LBA4) do not participate in subsequent data reduction again. FP3(LBA3) and FP4(LBA4) listed in SFP1=FP2(2)+FP3(LBA3)+FP4(LBA4)+FP1 (LBA5) are mainly used to show that the reference data block (FP2(LBA2)) can still be used as a reference in a subsequent task.

In a possible implementation, in the foregoing description, whether to generate a reduction task for the to-be-reduced data block may alternatively be determined based on the load of the processing device. A processing manner may be as follows:

The data reduction apparatus may obtain the load of the processing device, and determine whether the load is greater than the second value. When the load is greater than or equal to the second value, it is determined not to generate a reduction task for the to-be-reduced data block; when the load is less than the second value, it is determined to generate a reduction task for the to-be-reduced data block (how to generate the reduction task is described above).

It should be noted that, in this embodiment, a format of SFP=LBA is used to indicate index information of a data block. A key (the similar fingerprint) is located on a left side of an equal sign, and a value (the address) is located on a right side of the equal sign. In this embodiment, a format of FP=LBA is used to indicate index information of a data block. A key (the to-be-deduplicated fingerprint) is located on a left side of an equal sign, and a value (the address) is located on a right side of the equal sign. In this embodiment, a format of SFP=LBA+FP is used to indicate index information of a data block. A key (the similar fingerprint) is located on a left side of an equal sign, and a value (the address and the to-be-deduplicated fingerprint) is located on a right side of the equal sign.

In this embodiment, the data reduction apparatus obtains the fingerprint of the to-be-reduced data block, and forms the index set by using the index information of the data blocks with identical fingerprints. In the to-be-reduced data block, the data reduction apparatus may perform, based on the fingerprint of the to-be-reduced data block, data reduction processing on the data block to which the index information in the same index set belongs. In this way, because the index set is formed by using the index information of the data blocks with identical fingerprints, when the data blocks with identical fingerprints are searched for subsequently, one index set may be directly obtained, and it is not necessary to search all fingerprints. Therefore, data reduction efficiency can be improved.

Figure 14:
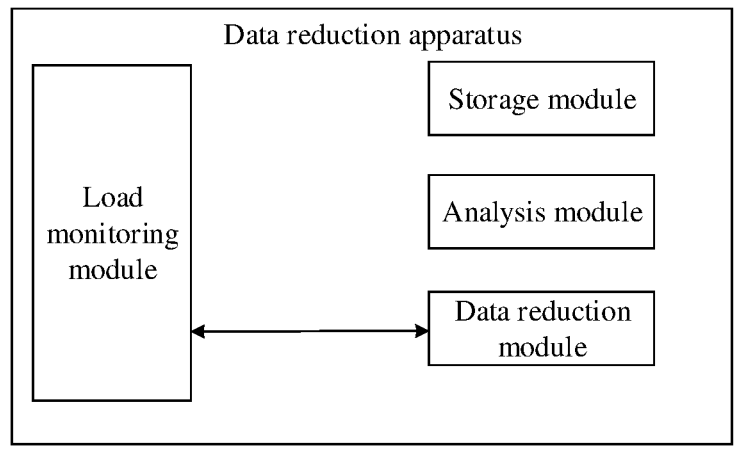
FIG. 14 is a schematic diagram of a structure of a data reduction apparatus according to an embodiment of this disclosure.

In addition, for the foregoing embodiment, as shown in FIG. 14, the data reduction apparatus may be divided into a load monitoring module, a storage module, an analysis module, and a data reduction module. There is a connection between the load monitoring module and the data reduction module. The load monitoring module is configured to obtain a load of a processing device, the storage module is configured to store index information, the analysis module is configured to determine a data reduction task, the data reduction module is configured to execute the data reduction task, and the load monitoring module is configured to notify the data reduction module of the load, and indicate whether to execute the data reduction task. Certainly, the load monitoring module may further establish a connection to the analysis module, and the load monitoring module is configured to notify the analysis module of the load, and indicate whether to generate the data reduction task, and the like. In addition, the data reduction apparatus may further include a fingerprint calculation module, configured to calculate a fingerprint of a data block.

Figure 15:
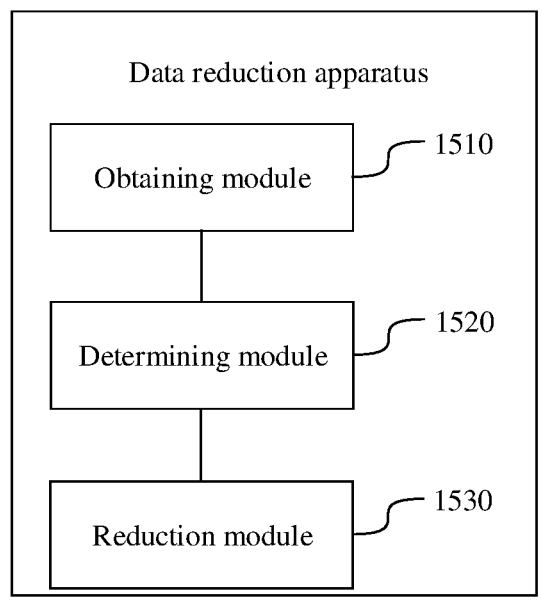
FIG. 15 is a schematic diagram of a structure of a data reduction apparatus according to an embodiment of this disclosure.

FIG. 15 is a diagram of a structure of a data reduction apparatus according to an embodiment of this disclosure. The apparatus may be implemented as a part or the entire of the apparatus by using software, hardware, or a combination thereof. The apparatus provided in this embodiment of may implement the process described in FIG. 2 according to embodiments of this disclosure, and the apparatus includes an obtaining module 1510, a determining module 1520, and a reduction module 1530.

The obtaining module 1510 is configured to obtain a fingerprint of a to-be-reduced data block, and may be specifically configured to implement an obtaining function in step 201 and perform an implicit step included in step 201.

The determining module 1520 is configured to form, based on the fingerprint of the to-be-reduced data block, an index set by using index information of data blocks with identical fingerprints, and may be specifically configured to implement a determining function in step 202 and perform an implicit step included in step 202.

The reduction module 1530 is configured to perform, in the to-be-reduced data block based on the fingerprint of the to-be-reduced data block, data reduction processing on the data block to which index information in a same index set belongs, and may be specifically configured to implement a reduction function in step 203 and perform an implicit step included in step 203.

In a possible implementation, the determining module 1520 is configured to:
  form, in the to-be-reduced data block based on an LSM tree and/or a K-V tree, the index set by using the index information of the data blocks with identical fingerprints.

In a possible implementation, the fingerprints are similar fingerprints or to-be-deduplicated fingerprints; and when the fingerprints are similar fingerprints, the index information includes an address of the data block, or an address of the data block and the to-be-deduplicated fingerprint; when the fingerprints are to-be-deduplicated fingerprints, the index information includes an address of the data block.

In a possible implementation, the fingerprints include similar fingerprints and to-be-deduplicated fingerprints; and the determining module 1520 is configured to:
  form a first index set by using first index information of the data blocks with identical similar fingerprints, and form a second index set by using second index information of the data blocks with identical to-be-deduplicated fingerprints, where the first index information includes an address of the data block, and the second index information includes an address of the data block; or
  form a third index set by using third index information of the data blocks with identical similar fingerprints, where the third index information includes an address of the data block and the to-be-deduplicated fingerprint.

In a possible implementation, the determining module 1520 is configured to:
  when a merging condition for a level n and a level n+1 of the LSM tree is met, merge, in the to-be-reduced data block, index information of the data blocks with identical fingerprints at the level n and the level n+1 into the level n+1, and after the index information is merged into the level n+1, form the index set by using the index information of the data blocks with identical fingerprints, where n is a natural number.

In a possible implementation, the determining module 1520 is configured to:
  when a load of a processing device on which the apparatus is deployed is greater than or equal to a first value, perform, based on the fingerprint of the to-be-reduced data block in the LSM tree, data reduction processing on the data block to which the index information in the same index set belongs; or
  when the load of the processing device is less than the first value or the to-be-reduced data block corresponds to a target identifier, perform, based on the fingerprint of the to-be-reduced data block in the K-V tree, data reduction processing on the data block to which the index information in the same index set belongs, where the target identifier is used to indicate to perform reduction processing on the data block in real time.

In a possible implementation, the obtaining module 1510 is further configured to:
  obtain a load of a processing device on which the apparatus is deployed; and
  the reduction module 1530 is configured to:
  create, based on the fingerprint of the to-be-reduced data block, a reduction task for the data block to which the index information in the same index set belongs, and execute the reduction task when the load of the processing device is less than a second value; or
  when the load of the processing device is less than a second value, create, based on the fingerprint of the to-be-reduced data block, a reduction task for the data block to which the index information in the same index set belongs, and execute the reduction task.

In this embodiment, the data reduction apparatus obtains the fingerprint of the to-be-reduced data block, and forms the index set by using the index information of the data blocks with identical fingerprints. In the to-be-reduced data block, the data reduction apparatus may perform, based on the fingerprint of the to-be-reduced data block, data reduction processing on the data block to which the index information in the same index set belongs. In this way, because the index set is formed by using the index information of the data blocks with identical fingerprints, when the data blocks with identical fingerprints are searched for subsequently, one index set may be directly obtained, and it is not necessary to search all fingerprints. Therefore, data reduction efficiency can be improved.

Division into the modules in embodiments of this disclosure is an example, is merely division into logical functions, and may be other division in an actual implementation. In addition, functional modules in embodiments of this disclosure may be integrated into one processor, or each of the modules may exist alone physically, or two or more modules may be integrated into one module. The integrated module may be implemented in a form of hardware, or may be implemented in a form of a software function module.

In this embodiment, a computer-readable storage medium is further provided. The computer-readable storage medium stores computer instructions. When the computer instructions stored in the computer-readable storage medium are executed by a computing device, the computing device is enabled to perform the data reduction method provided above.

In this embodiment, a computer program product that includes instructions is provided. When the computer program product runs on a computing device, the computing device is enabled to perform the data reduction method provided above.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a server or a terminal, all or some of the procedures or functions according to embodiments of this disclosure are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

What is claimed is:

1. A data reduction method, comprising:
obtaining fingerprints of to-be-reduced data blocks;
forming an index set based on the fingerprints of the to-be-reduced data blocks by using index information of data blocks with identical fingerprints, the index set comprising the index information of the data blocks, and the index information including addresses of the data blocks; and
performing, in the to-be-reduced data blocks based on the fingerprints of the to-be-reduced data blocks, data reduction processing on data blocks with index information in a same index set,
wherein the fingerprints of the data blocks are similar fingerprints or to-be-deduplicated fingerprints, the similar fingerprints are for determining whether similar deduplication can be performed on the data blocks, and the to-be-deduplicated fingerprints are for determining whether the data blocks can be deduplicated, and
wherein the index information of each of the data blocks is indicated by a key-value pair comprising a key and a value corresponding to the key, and
wherein, in the key-value pair indicating each of the data blocks, the key is the similar fingerprint of the data block, and the value comprises both the address of the data block and the to-be-deduplicated fingerprint of the data block.

2. The method according to claim 1, wherein the forming an index set by using index information of data blocks with identical fingerprints comprises:
forming, in the to-be-reduced data blocks based on a log-structured merge (LSM) tree and/or a key-value pair (K-V) tree, the index set by using the index information of the data blocks with identical fingerprints.

3. The method according to claim 2, wherein when the fingerprints are similar fingerprints, the index information comprises one or more addresses of at least one of the data blocks, or both one or more addresses of at least one of the data blocks and at least one of the to-be-deduplicated fingerprints; and when the fingerprints are to-be-deduplicated fingerprints, the index information comprises one or more addresses of at least one of the data blocks.

4. The method according to claim 2, wherein
the forming an index set by using index information of the data blocks with identical fingerprints comprises:
forming a first index set by using first index information of the data blocks with identical similar fingerprints, and forming a second index set by using second index information of the data blocks with identical to-be-deduplicated fingerprints, wherein the first index information comprises one or more addresses of at least one of the data blocks, and the second index information comprises one or more addresses of at least one of the data blocks; and
forming a third index set by using third index information of the data blocks with identical similar fingerprints, wherein the third index information comprises one or more addresses of at least one of the data blocks and at least one of the to-be-deduplicated fingerprints.

5. The method according to claim 2, wherein the forming, in the to-be-reduced data blocks based on an LSM tree, the index set by using the index information of the data blocks with identical fingerprints comprises:
when a merging condition for a level n and a level n+1 of the LSM tree is met, merging, in the to-be-reduced data blocks, index information of the data blocks with identical fingerprints at the level n and the level n+1 into the level n+1, and after the index information is merged into the level n+1, forming the index set by using the index information of the data blocks with identical fingerprints, wherein n is a natural number.

6. The method according to claim 2, wherein when the index set is formed, in the to-be-reduced data blocks based on the LSM tree and the K-V tree, by using the index information of the data blocks with identical fingerprints, the performing, based on the fingerprints of the to-be-reduced data blocks, data reduction processing on data blocks with index information in a same index set comprises:

when a load of at least one processor that performs the method is greater than or equal to a first value, performing, based on the fingerprints of the to-be-reduced data blocks in the LSM tree, data reduction processing on the data blocks with the index information in the same index set; and when the load of the at least one processor is less than the first value or the to-be-reduced data blocks correspond to a target identifier, performing, based on the fingerprints of the to-be-reduced data blocks in the K-V tree, data reduction processing on the data blocks with the index information in the same index set, wherein the target identifier indicates to perform reduction processing on the data blocks in real time.

7. The method according to claim 5, further comprising:

obtaining a load of at least one processor that performs the method; and the performing, based on the fingerprints of the to-be-reduced data blocks, data reduction processing on data blocks with index information in a same index set comprises:

creating, based on the fingerprints of the to-be-reduced data blocks, a reduction task for the data blocks of which the index information in the same index set, and executing the reduction task when the load of the at least one processor is less than a second value; and when the load of the at least one processor is less than a second value, creating, based on the fingerprints of the to-be-reduced data blocks, a reduction task for the data blocks of which the index information in the same index set, and executing the reduction task.

8. A data reduction apparatus, comprising:

an interface; and at least one processor coupled to the interface and configured to:

obtain fingerprints of to-be-reduced data blocks;

form an index set based on fingerprints of the to-be-reduced data blocks by using index information of data blocks with identical fingerprints, the index set comprising the index information of the data blocks, and the index information including addresses of the data blocks; and perform, in the to-be-reduced data blocks based on the fingerprints of the to-be-reduced data blocks, data reduction processing on data blocks with index information in a same index set, wherein the fingerprints of the data blocks are similar fingerprints or to-be-deduplicated fingerprints, the similar fingerprints are for determining whether similar deduplication can be performed on the data blocks, and the to-be-deduplicated fingerprints are for determining whether the data blocks can be deduplicated, and wherein the index information of each of the data blocks is indicated by a key-value pair comprising a key and a value corresponding to the key, and wherein, in the key-value pair indicating each of the data blocks, the key is the similar fingerprint of the data block, and the value comprises both the address of the data block and the to-be-deduplicated fingerprint of the data block.

9. The data reduction apparatus according to claim 8, wherein the at least one processor is further configured to:

form, in the to-be-reduced data blocks based on a log-structured merge (LSM) tree and/or a key-value pair (K-V) tree, the index set by using the index information of the data blocks with identical fingerprints.

10. The data reduction apparatus according to claim 8, wherein when the fingerprints are similar fingerprints, the index information comprises one or more addresses of at least one of the data blocks, or both one or more addresses of at least one of the data blocks and the to-be-deduplicated fingerprints; and when the fingerprints are to-be-deduplicated fingerprints, the index information comprises one or more addresses of at least one of the data blocks.

11. The data reduction apparatus according to claim 9, wherein the at least one processor is further configured to:

form a first index set by using first index information of the data blocks with identical similar fingerprints, and form a second index set by using second index information of the data blocks with identical to-be-deduplicated fingerprints, wherein the first index information comprises one or more addresses of at least one of the data blocks, and the second index information comprises one or more addresses of at least one of the data blocks; and form a third index set by using third index information of the data blocks with identical similar fingerprints, wherein the third index information comprises one or more addresses of at least one of the data blocks and the to-be-deduplicated fingerprints.

12. The data reduction apparatus according to claim 9, wherein the at least one processor is further configured to:

when a merging condition for a level n and a level n+1 of the LSM tree is met, merge, in the to-be-reduced data blocks, index information of the data blocks with identical fingerprints at the level n and the level n+1 into the level n+1, and after the index information is merged into the level n+1, form the index set by using the index information of the data blocks with identical fingerprints, wherein n is a natural number.

13. The data reduction apparatus according to claim 9, wherein the at least one processor is further configured to:

when a load of the at least one processor is greater than or equal to a first value, perform, based on the fingerprints of the to-be-reduced data blocks in the LSM tree, data reduction processing on the data blocks with the index information in the same index set; and when the load of the at least one processor is less than the first value or the to-be-reduced data blocks correspond to a target identifier, perform, based on the fingerprints of the to-be-reduced data blocks in the K-V tree, data reduction processing on the data blocks with the index information in the same index set, wherein the target identifier indicates to perform reduction processing on the data blocks in real time.

14. The data reduction apparatus according to claim 12, wherein the at least one processor is further configured to:

obtain a load of the at least one processor;

create, based on the fingerprints of the to-be-reduced data blocks, a reduction task for the data blocks with the index information in the same index set, and execute the reduction task when the load of the at least one processor is less than a second value; and when the load of the at least one processor is less than a second value, create, based on the fingerprints of the to-be-reduced data blocks, a reduction task for the data blocks with the index information in the same index set, and execute the reduction task.

15. A non-transitory storage medium storing information comprising instructions that, when executed by at least one processor, control the at least one processor to perform operations comprising:

obtaining fingerprints of to-be-reduced data blocks;

forming an index set based on the fingerprints of the to-be-reduced data blocks by using index information of data blocks with identical fingerprints, the index set comprising the index information of the data blocks, and the index information including addresses of the data blocks; and performing, in the to-be-reduced data blocks based on the fingerprints of the to-be-reduced data blocks, data reduction processing on data blocks with index information in a same index set, wherein the fingerprints of the data blocks are similar fingerprints or to-be-deduplicated fingerprints, the similar fingerprints are for determining whether similar deduplication can be performed on the data blocks, and the to-be-deduplicated fingerprints are for determining whether the data blocks can be deduplicated, and wherein the index information of each of the data blocks is indicated by a key-value pair comprising a key and a value corresponding to the key, and wherein, in the key-value pair indicating each of the data blocks, the key is the similar fingerprint of the data block, and the value comprises both the address of the data block and the to-be-deduplicated fingerprint of the data block.

16. The non-transitory storage medium according to claim 15, wherein the forming an index set by using index information of data blocks with identical fingerprints comprises:

forming, in the to-be-reduced data blocks based on a log-structured merge (LSM) tree and/or a key-value pair (K-V) tree, the index set by using the index information of the data blocks with identical fingerprints.

17. The non-transitory storage medium according to claim 16, wherein when the fingerprints are similar fingerprints, the index information comprises one or more addresses of at least one of the data blocks, or both one or more addresses of at least one of the data blocks and at least one of the to-be-deduplicated fingerprints; and when the fingerprints are to-be-deduplicated fingerprints, the index information comprises one or more addresses of at least one of the data blocks.

* * * * *